(12) United States Patent
Brooks

(10) Patent No.: US 6,587,964 B1
(45) Date of Patent: Jul. 1, 2003

(54) TRANSPARENT SOFTWARE EMULATION AS AN ALTERNATIVE TO HARDWARE BUS LOCK

(75) Inventor: Robert J Brooks, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/504,023

(22) Filed: Feb. 18, 2000

(51) Int. Cl.$^7$ .................................................. G06F 11/00
(52) U.S. Cl. ............................. 714/28; 714/38; 710/108
(58) Field of Search ............................. 714/28, 38, 43; 710/108; 703/28, 26

(56) References Cited

U.S. PATENT DOCUMENTS

| | | | | |
|---|---|---|---|---|
| 5,050,072 A | * | 9/1991 | Earnshaw et al. | 710/108 |
| 5,572,734 A | * | 11/1996 | Narad et al. | 710/200 |
| 5,655,111 A | * | 8/1997 | Uegaki | 703/28 |
| 5,761,659 A | * | 6/1998 | Bertoni | 707/201 |
| 5,787,270 A | * | 7/1998 | Bloomer et al. | 714/28 |
| 5,850,529 A | * | 12/1998 | Nakamura | 710/108 |
| 5,859,999 A | | 1/1999 | Morris et al. | 395/565 |
| 5,860,017 A | | 1/1999 | Sharangpani et al. | 395/800.23 |
| 5,894,562 A | * | 4/1999 | Moyer | 710/108 |
| 5,987,550 A | * | 11/1999 | Shagam | 710/108 |
| 6,076,126 A | * | 6/2000 | Shagam | 709/210 |
| 6,295,598 B1 | * | 9/2001 | Bertoni et al. | 712/23 |
| 6,430,657 B1 | * | 8/2002 | Mittal et al. | 711/118 |

* cited by examiner

Primary Examiner—Robert Beausoliel
Assistant Examiner—Christopher McCarthy

(57) ABSTRACT

A method and apparatus for emulating hardware bus lock in a multi-architecture computer system includes a fault handler that acquires a semaphore reserved for bus lock and a semaphore that limits access to a page table. The fault handler includes an emulation module that sets a mode bit to prevent the bus lock and allows re-execution of the instruction that caused a request for a hardware bus lock. Using this method, the fault handler ensures a minimum disruption to operation of the computer system by restricting access to the least amount of computer system resources.

14 Claims, 6 Drawing Sheets

TRANSPARENT SOFTWARE EMULATION AS AN ALTERNATIVE TO HARDWARE BUS LOCK

TECHNICAL FIELD

The technical field is computer architecture that use mechanisms to prevent conflicting access to shared computer resources.

BACKGROUND

Current computer systems use various means to ensure temporary exclusivity of access of a central processing unit (CPU) or other active system agent to a memory data item or input/output device. One such means is a bus lock. A bus lock is a hardware mechanism in which the agent programmed for atomic, exclusive access to the memory data item, the input/output device, or a combination of the two, signals its requirement for exclusive access using a signal transmitted on to a system bus or interconnect. Other system agents are then prevented from accessing the locked item or items during the interval that the locking agent signals exclusive access.

This hardware bus locking mechanism presents serious performance issues, with a disproportionately larger impact on larger systems. This is because it is generally prohibitively complex to restrict the scope of the lock, using hardware mechanisms, to the particular items being accessed. For example, large portions of a system, or even the entire system, may be inaccessible to other agents during the lock, causing substantial stalls.

Even without trying to narrow the scope of the lock, the implementation of hardware bus lock in large systems is complex. The complexity arises from having to propagate the lock indication through the system, over perhaps many busses or other interconnects, while managing conflicting, simultaneous lock attempts so as to assure forward progress and data integrity. For example, current computer systems may be implemented using several busses, all running in parallel. In such a system, two or more lock attempts may occur simultaneously, and some type of arbitration mechanism would be required to determine which active agent acquires the bus lock. Otherwise, a deadlock situation could arise, and system processing could be halted.

One solution to this problem is to implement the computer system hardware so that no matter how large the computer system, a system-wide bus lock is available. However, this solution is impractical because one process running on one processor in the computer system can cause a system-wide stall during the time the bus lock is being serviced.

Another solution to the above design performance problems is to administer the exclusivity using cacheable semaphores. However, this choice is not directly available in the case of a computer system required to be backward compatible with a legacy architecture that makes the bus lock feature available in a visible way to software.

SUMMARY

A software emulation module provides the functions of a hardware bus lock without the attendant disadvantages of the hardware bus lock. Code sequences that would ordinarily trigger a bus lock signal are used to cause a fault. A fault handler acquires a cacheable semaphore that is reserved for bus lock emulation purposes. The fault handler also acquires a semaphore that is used to ensure exclusive access to native page tables or equivalent address space protection mechanisms. The software emulation module then causes invalidation of relevant page table entries, purges translation lookaside buffer pages of the locking accesses, and sets a mode bit that defeats any fault-on-lock-attempt behavior. The emulation module then locally inserts any needed translation/protection entries, executes the locking sequence and then clears the mode bit. Finally, the emulation module causes the semaphores to be released and the normal flow of execution returns.

Using the software emulation module, the portion of memory space that is locked may be reduced, using paging or a similar mechanism, and other system agents are only affected if the agents attempt to access the locked portion of the memory space during the interval in which the bus lock signal is asserted.

DESCRIPTION OF THE DRAWINGS

The detailed description will refer to the following drawings in which like numerals refer to like objects, and in which.

DETAILED DESCRIPTION

An alternative to a hardware bus lock mechanism provides exclusive access to a data item in a memory of a computer system, a device in the computer system, or a set of the item and the device. A software emulation module provides the functionality of exclusive access to such shared computer system resources without the drawbacks inherent in current computer systems. The software emulation module causes signals that could cause a bus lock to instead cause a fault. A fault handler then causes execution of a series of steps that provide exclusive access to a desired item.

Figure 1:
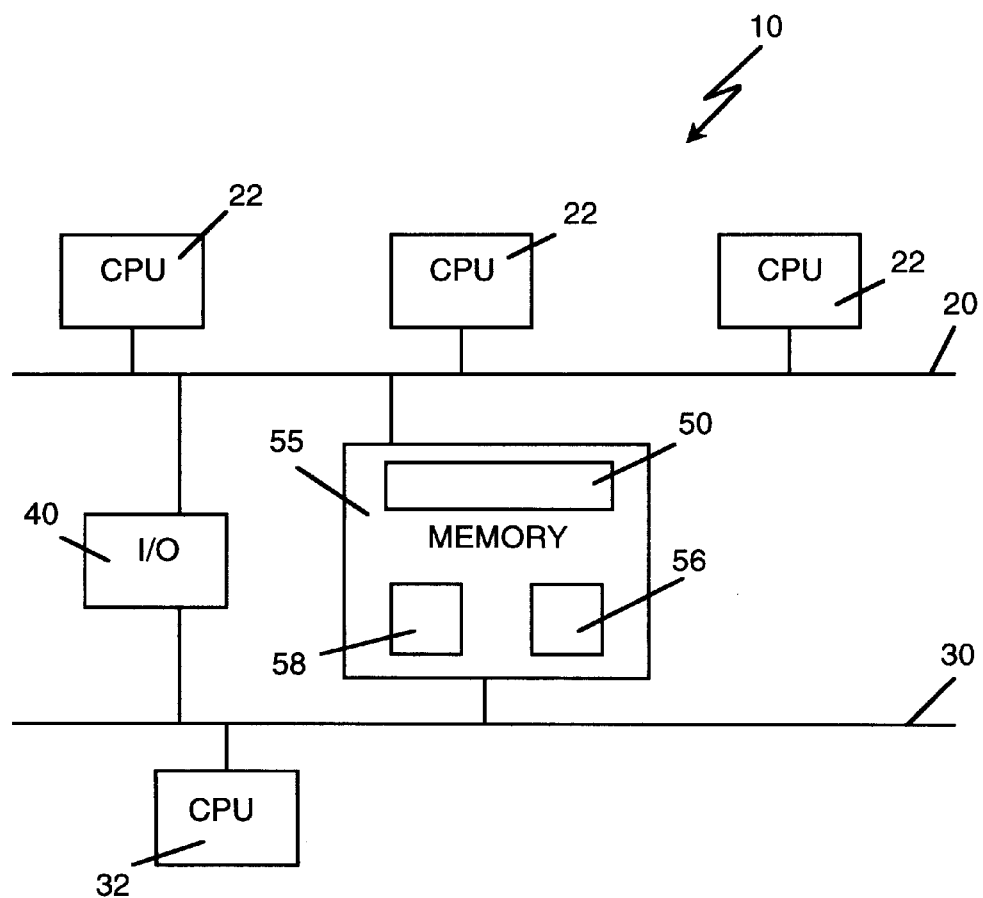
FIG. 1 is a block diagram of an computer architecture that uses software emulation as an alternative to hardware bus lock.

FIG. 1 shows a computer system 10 that uses software emulation of hardware bus lock. A first bus 20 connects first processors 22. A second bus 30, operating in parallel with the first bus 20, connects second processor 32. The first processors 22 may be of a first computer architecture. That is, the first processors 22 may operate in accordance with an instruction set of the first computer architecture. The second processor 32 may be of a second architecture, such as a legacy architecture, for example. Alternatively, the second processor 32 may be of the same architecture as the first processors 22. Furthermore, multiple second processors 32 may connect to the second bus 30. Finally, the first bus 20 and the second bus 30 may comprise multiple busses. For example, the first bus 20 may comprise an address portion, data portion and control portion. Further, there may be additional busses similar to those shown or any other hierarchy or arrangement.

An input/output (I/O) chipset 40 is coupled to the first bus 20 and the second bus 30. The I/O chipset 40 performs many functions, such as receiving interrupts generated by I/O devices (not shown) and distributing them among the first processors 22 and the second processor(s) 32. The I/O chipset 40 may also control access to main memory 55 and other computer system architectural features.

The main memory 55 may include one or more semaphores that are used in conjunction with the software emulation of hardware bus lock. The semaphores may be cacheable.

Figure 2:
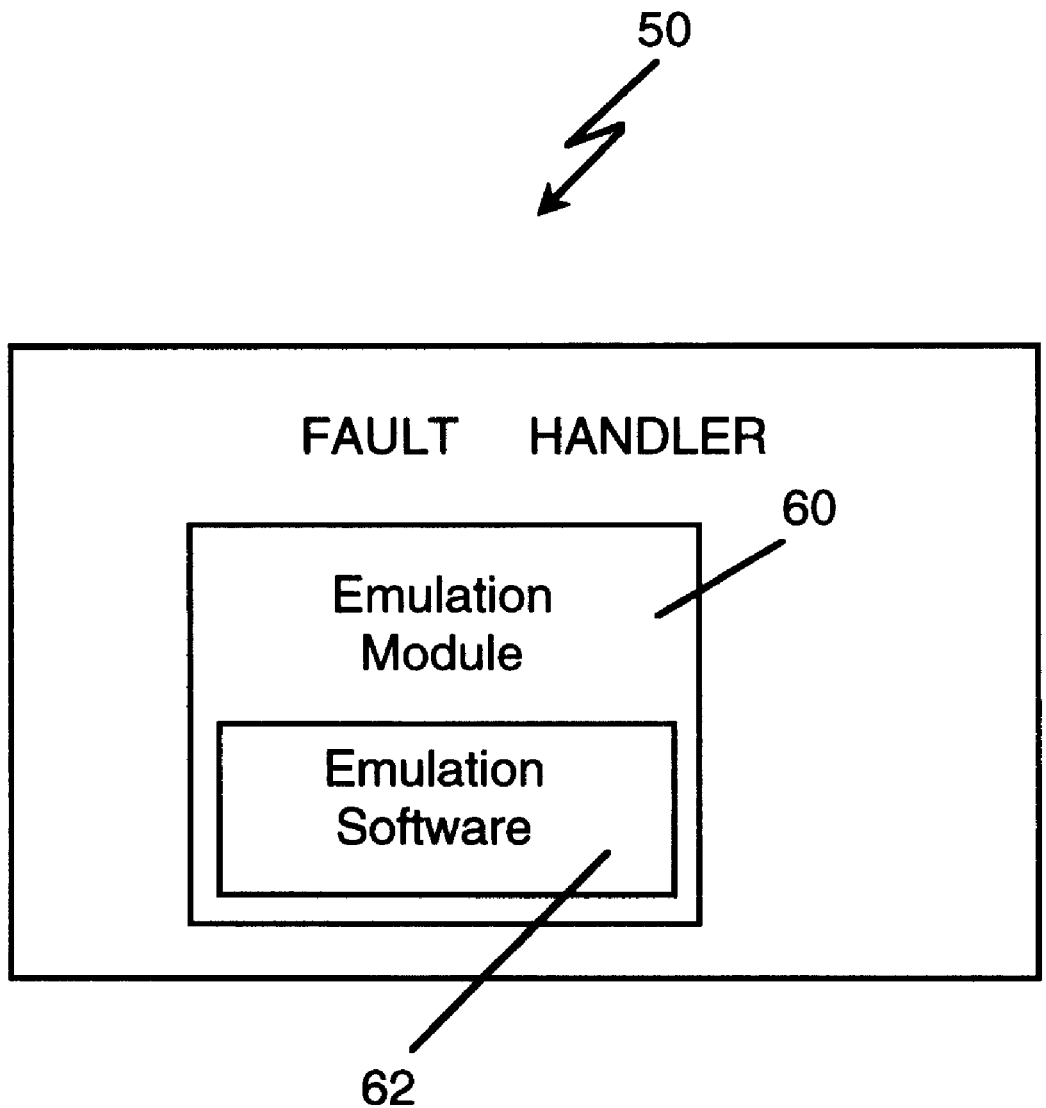
FIG. 2 is a block diagram of the fault handler used with the computer architecture of FIG. 1.

A fault handler 50 may be a software module operating on a CPU. The fault handler 50 is shown in more detail in FIG. 2, and may include an emulation module 60 that provides for software emulation as an alternative to hardware bus lock.

Figure 3:
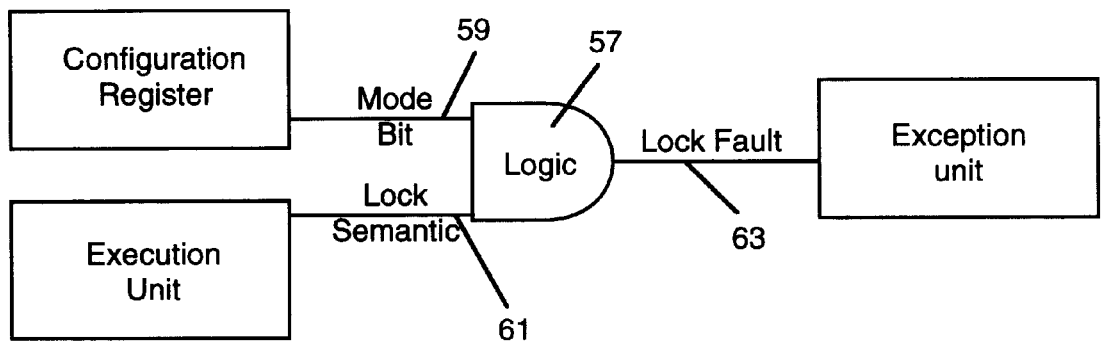
FIG. 3 illustrates a logical device used with the fault handler of FIG. 2.

FIG. 3 illustrates a logic device 57 that receives a mode bit (or lock fault enable bit) 59 and a lock semantic indication (or request for a bus lock) 61. The mode bit 59 is supplied from a configuration register and the lock semantic indication 61 is supplied from an execution unit. The logic device 57 outputs a lock fault 63 to an exception unit.

In operation, the fault handler 50 may acquire a cacheable first, or bus lock, semaphore 56 that is reserved for bus lock emulation purposes. The bus lock semaphore 56 may be in a cache or in the main memory 55. That is, the bus lock semaphore 56 may be in a defined memory location that is reserved, or set aside by firmware at, for example, boot up, so that the bus lock semaphore 56 is invisible to the computer system's operating system. Then, only the emulation module 60 would have access to the bus lock semaphore 56.

The fault handler 50 may also acquire a second, or page table semaphore 58, or an equivalent address space protection mechanism, that is used to ensure exclusive access to native page tables. That is, the computer system 10 may have an address translation and protection mechanism that is implemented by a page table in the main memory 55. The page table is used to cross-reference virtual addresses to physical addresses and to protect memory pages from various types and privilege levels of access. The page table is protected by the page table semaphore 58. Therefore, before a processor can alter the page table, the processor first acquires the page table semaphore 58.

Using emulation software 62 in the emulation module 60, the fault handler 50 may invalidate relevant page table entries. This prevents other processors from looking up this locked region of main memory 55 in the page table, and then accessing the locked region. In essence, the locked region of the main memory 55 is hidden from other processors or agents in the computer system 10. The emulation software 62 in the emulation module 60 would then be used to purge any page table entries in translation lookaside buffers (TLBs) (not shown in FIG. 1) that correspond to the invalidated page table entries.

The fault handler 50 then sets a mode bit that defeats any fault-on-lock-attempt behavior. Then, the fault handler 50 locally inserts any needed translation or protection entries. That is, to access the locked memory region, translation protection entries (translations between virtual and physical addresses) are written to the page table or a TLB, or both. The instruction sequence that caused the bus lock is then executed, either by re-executing the same instruction sequence that caused the fault-on-bus-lock, or by executing a clone routine that performs the same operation, but without the locked semantic attached. Once the bus lock instruction sequence has been executed, the fault handler 50 clears the mode bit and releases the first and the second semaphores. Processing in the computer system 10 then returns to the normal execution flow.

Using the fault handler 50 and the emulation module 60, the scope of the bus lock mechanism can be reduced to a small address space, using paging or a similar mechanism, for example. Another processor or agent is only affected if that processor attempts to access the same address space during the interval that the bus lock signal is asserted. That is, once a fault is taken on a bus lock attempt, data related to the fault is saved and is observable by the fault handler 50. The saved data includes the address or addresses that were attempted to be accessed. Thus the fault handler 50 has available the address or addresses that were attempted to be accessed during a bus lock operation. This permits the emulation module 60 to remove access to only a page or two of memory, rather than remove access to all the computer system resources or to a larger region of the main memory 55.

Software emulation of hardware bus lock has been described above in relation to access to memory. However, the same software emulation mechanism may be used in the case of a simultaneous access of an I/O device by more than one processor of the computer system 10. In this situation, the I/O device appears to the processors as just another memory mapped entity, or region of memory.

In another situation, a processor and an I/O device may attempt to access the same memory region simultaneously. The I/O device may include a TLB or a paging-type mechanism, similar to that associated with the processor. In this case, operation of the emulation module 60 and the fault handler 50 would be the same as the situation in which multiple processors attempt to access the same memory region. If the I/O device does not include a TLB or paging-type mechanism, then the fault handler 50 may temporarily disable an I/O device or set of devices to prevent the I/O device from accessing the memory region.

The fault handler 50 and the emulation module 60 may be used with multiple architecture processors, such as the processors 22 and 32. However, one or more processors might not operate in a paged or otherwise protected scheme. That is, one or more of the processors might operate in a real mode, or might access the main memory 55 in the real mode. In this alternative, a real-mode lock attempt may cause an inter-processor interrupt to be sent to other processors. The other processors would then return an interrupt acknowledged signal before the real-mode lock is asserted. The other processors would enter a wait state and would be awakened by another interrupt when the locked operation was complete. However, this situation should occur only rarely.

The computer system 10 includes operating system (O/S) page table management code that is restricted from acquiring a bus lock itself. Otherwise, a first processor or agent could acquire the bus lock semaphore 56. Then, a second processor operating on the O/S page table management code could acquire the page table semaphore 58, and then attempt to acquire the locked semaphore 56 using the emulation sequence. In this event, the first and the second processors deadlock because neither can acquire both the bus lock semaphore 56 and the page table semaphore 58.

As noted above, the software emulation of hardware bus lock mechanism may be used with multiple computer architectures. An example is the use of software emulation with an IA-32 architecture and an IA 64 architecture. In this situation, the IA-32 architecture may be implemented using microcode. One feature of the microcoded IA-32 architecture is single step trapping. A trap is an exception that is reported immediately following the execution of a trapping instruction. An exception is generated by a processor when the processor detects errors during execution of an application program or the O/S code. Traps allow execution of the application program to be continued without loss of program continuity. A return address for a trap handler points to the instruction to be executed after the trapping instruction. The single step trapping allows the locking instruction sequence to be implemented by setting a flag for a trap handler to hand off to the fault handler 50, clearing the single-step mode and re-executing the macroinstruction that faulted.

As noted above, the software emulation mechanism may set a mode bit that defeats fault-on-lock-attempt behavior. In an alternative embodiment, the mode bit may be mode bit that distinguishes between hardware bus lock and software emulation of hardware bus lock. In this embodiment, a bus lock signal may be asserted by a processor, but would be ignored by the computer system, such as by physical disconnection. Thus, the processor, apart from the computer system, may support both hardware bus lock and software emulation of hardware bus lock. This allows the processor to be used in a computer system that supports hardware bus lock only as well as in a computer system that supports software emulation of hardware bus lock.

Figure 4:
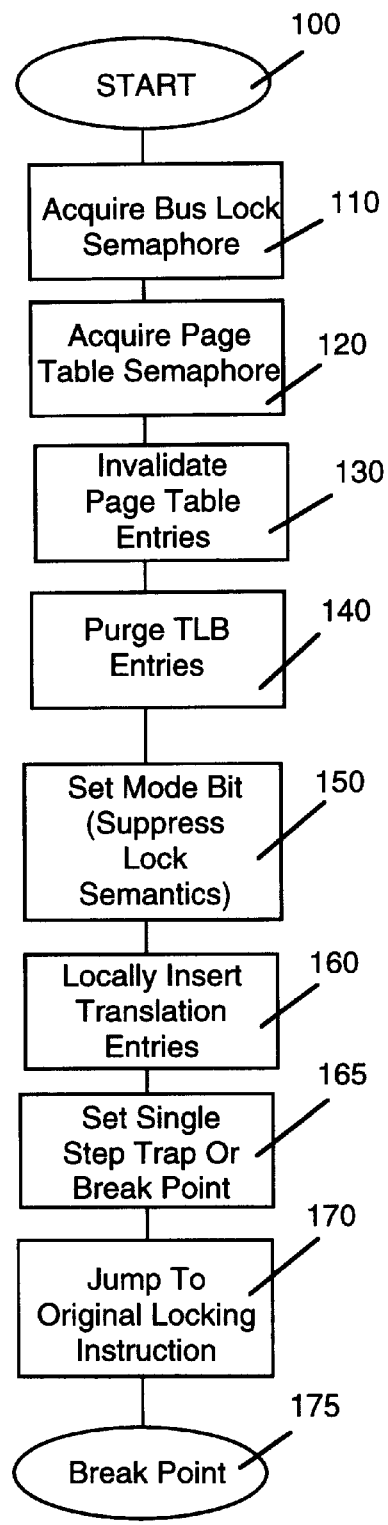
FIGS. 4–6 are is flowcharts illustrating the processes of software emulation.

Operation of the software emulation mechanism will now be described with reference to FIGS. 4–6, which are flowcharts of the processes executed to implement software emulation of hardware bus lock. In FIG. 4, the process starts at block 100 with a processor attempting a bus lock operation, for example to access a desired memory region. The fault handler 50 acquires the bus lock semaphore 56 and provides the bus lock semaphore to the processor, such as one of the processors 22, that attempted the bus lock, block 110. The bus lock semaphore 56 may be cached in a cache associated with the processor 22. The fault handler 50 next acquires the page table semaphore 58, which may also be cached, block 120. The fault handler 50 then invalidates any relevant page table entries, block 130, thereby preventing access to the desired memory region. The fault handler 50 also purges any TLB pages associated with the desired memory region, block 140.

To execute the bus lock, the fault handler 50 sets a mode bit that defeats a fault-on-lock attempt of the processor, block 150, and locally inserts any needed translation/protection entries, block 160. Next, the single step or break point is set, block 165, and the process jumps to the original lockup instruction, block 170. The process then moves to break point, block 175.

Figure 5:
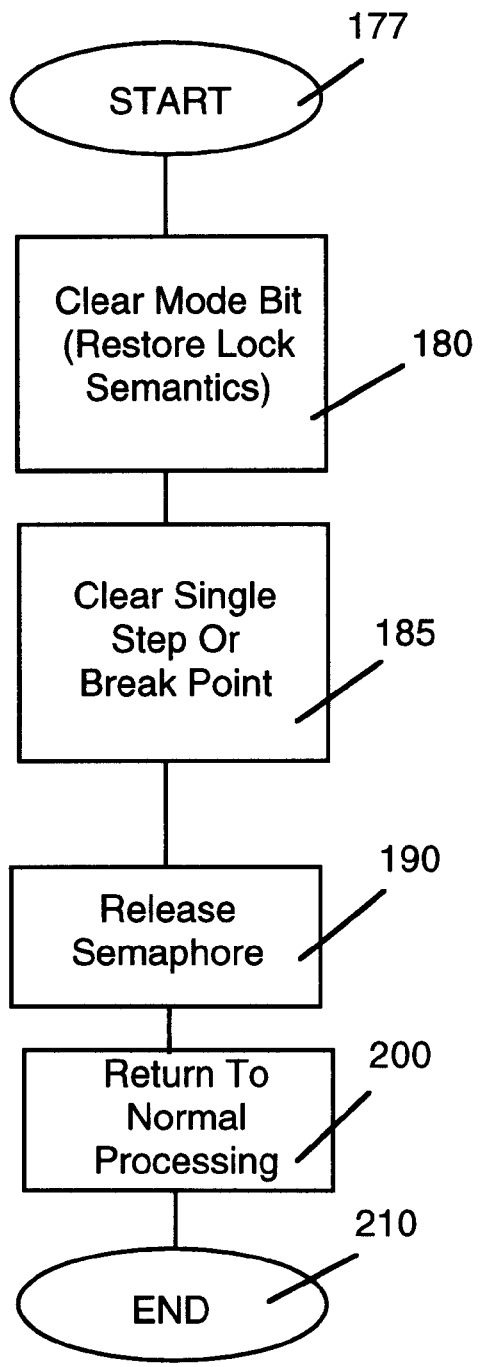

FIG. 5 illustrates the process for the single step break point handler routine. The process starts at block 177, and then (block 180) the fault handler 50 clears the mode bit set at block 150 (see FIG. 4). Finally, the processor clears the single step trap (block 185) and releases the bus lock semaphore 56 and the page table semaphore 58, processing in the computer system returns to normal execution, block 200, and the process ends, block 210.

Figure 6:
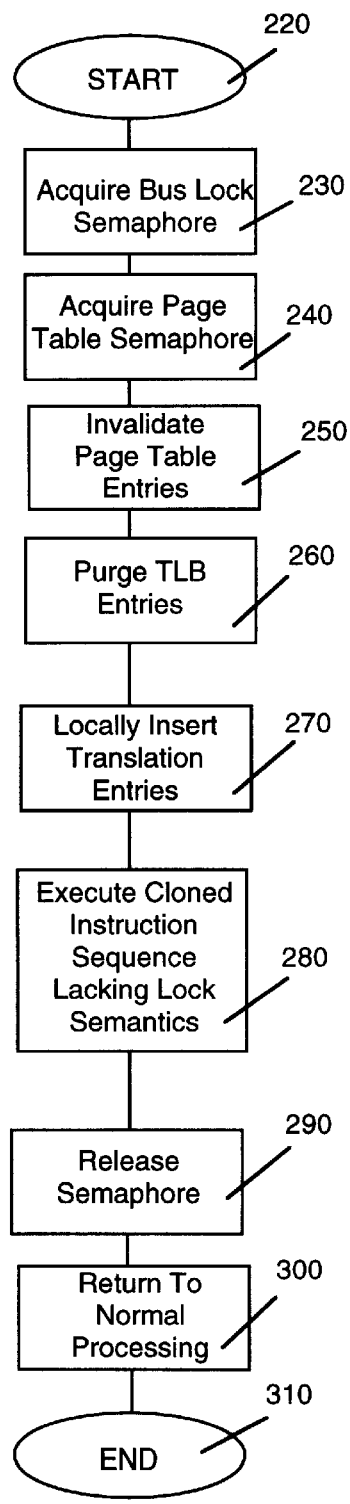

FIG. 6 illustrates an alternative process for software emulation of hardware bus lock in which a clone instruction is executed. In FIG. 6, process blocks 220, 230, 240, 250, and 260 correspond to process blocks 100, 110, 120, 130, and 140 of FIG. 4. In block 270, the local translation entries are inserted. In block 280, the clone instruction sequence is executed, without lock semantics. The remaining blocks 290, 300, and 310 correspond to process blocks 190, 200, and 210 of FIG. 4.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method for emulating hardware bus lock in a computer system, comprising:
   acquiring a bus lock semaphore reserved for bus lock emulation;
   acquiring a page table semaphore;
   setting a mode bit that defeats fault-on-lock-attempt behavior;
   invalidating relevant page table entries;
   executing an instruction; and
   releasing mode bit and the bus lock and page table semaphores.

2. The method of claim 1, further comprising purging translation lookaside buffers storing the relevant page table entries.

3. The method of claim 1, further comprising a mode bit that distinguishes between hardware bus lock and emulation of hardware bus lock.

4. The method of claim 1, further comprising locally inserting translation/protection entries.

5. The method of claim 1, wherein the computer system includes multiple computer architectures, and wherein a device requesting a bus lock is one of a central processing unit and an input/output device.

6. The method of claim 1, wherein the instruction to be executed is an instruction that requested the bus lock.

7. The method of claim 1, wherein the instruction to be executed is a clone routine without the bus lock semantics.

8. The method of claim 1, wherein the instruction is an original instruction causing the bus fault.

9. A method for emulating a hardware bus lock in a computer system, comprising:
   receiving a hardware bus lock request from a device in the computer system;
   generating a fault in response to the hardware bus lock request;
   setting a mode bit that defeats fault-on-lock-attempt behavior, thereby preventing a hardware bus lock;
   processing the fault in a fault handler; and
   releasing the mode bit after the processing.

10. The method of claim 9, further comprising:
    setting a first semaphore for bus lock emulation;
    setting a second semaphore to limit page access; and
    after the processing step, releasing the first and the second semaphores.

11. An apparatus for emulating hardware bus lock in a computer system, comprising:
    a fault handler that, in response to a device requesting a hardware bus lock, acquires a bus lock semaphore and a page table semaphore; and
    an emulation module coupled to the fault handler that invalidates entries in a page table, wherein the fault handler sets a mode bit that defeats fault-on-lock-attempt behavior to prevent hardware bus lock, releases the mode bit and the semaphores after execution of an instruction by the device.

12. The apparatus of claim 11, wherein the bus lock semaphore and the page table semaphore are cacheable.

13. The apparatus of claim 11, wherein the instruction is an original instruction that caused the bus fault.

14. The apparatus of claim 11, wherein the instruction is a clone instruction or clone instruction sequence.

* * * * *